Sept. 20, 1966          J. J. O'MALLEY          3,273,420
TRANSMISSION
Filed Dec. 6, 1963
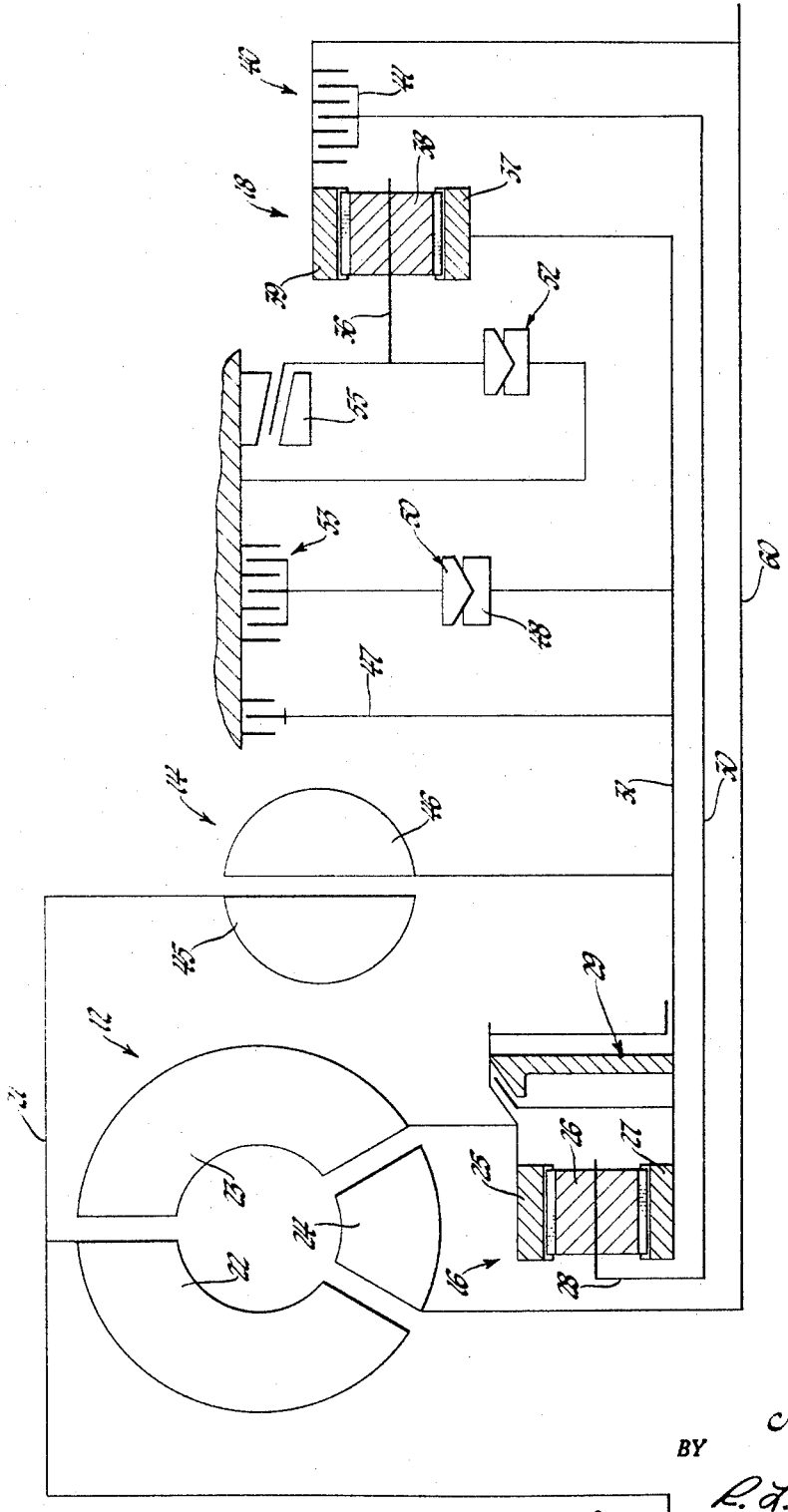
INVENTOR.
John J. O'Malley
BY
R. L. Spencer
ATTORNEY United States Patent Office 3,273,420
Patented Sept. 20, 1966

3,273,420
TRANSMISSION
John J. O'Malley, Livonia, Mich., assignor to General Motors Corporation, Detroit, Mich., a corporation of Delaware
Filed Dec. 6, 1963, Ser. No. 328,538
10 Claims. (Cl. 74—677)

This invention relates to transmissions and more particularly to transmissions of the type commonly used in automotive vehicles and known as automatic transmissions.

An object of this invention is to provide a transmission of the type including a hydrodynamic torque converter, planetary gearing, and control fluid coupling wherein drive in direct drive is entirely hydraulic through the converter and coupling with the torque applied to one gear unit split between the converter and fluid coupling.

Another object of this invention is to provide a transmission of the type described wherein the torque converter reaction member is fixed for rotation with the final power delivery shaft of the transmission.

A further object of this invention is to provide an automatic transmission of the type described incorporating a torque converter and two planetary gearing units wherein the sun gears of the two gearing units are fixed to each other for rotation as a unit.

An additional object of this invention is to provide a transmission of the type described incorporating a hydrodynamic torque converter and planetary gearing whereing the torque converter reaction member is fixed for rotation with the final power delivery shaft and wherein the planet carrier of one gear unit is clutched to the final power delivery shaft for rotation as a unit therewith in all forward drive ratios.

A further object of this invention is to provide a transmissilon incorporating a torque converter wherein the torque converter reaction member is fixed for rotation with the final power delivery shaft and is effective in high gear forward drive to function as a turbine to drive the output shaft forwardly and in effective in reverse drive to function both as a rearwardly rotating reaction member to accomplish torque multiplication in the converter and to function as a rearwardly rotating turbine to apply reverse thrust directly to the final power delivery shaft.

An additional object of this invention is to provide a transmission of the type described incorporating a hydraulic torque converter, two planetary gearing units and a fluid coupling wherein the sun gears of the two gearing units are connected to each other for rotation as a unit and are driven reversely to establish low gear forward drive, are held against reverse rotation to establish second gear forward drive, are driven forwardly through a hydraulic coupling to establish direct forward drive, and are driven forwardly through a mechanical clutch to establish reverse drive.

These and other objects and advantages of this invention will be apparent from the following specification and claims, taken in conjunction with the accompanying drawings, in which:

The sole figure is a schematic diagram of a transmission constructed in accordance with the principles of this invention.

Referring to the drawing there is shown in schematic diagram of a transmission constructed in accordance with the principles of this invention and incorporating a hydraulic torque converter unit 12, a hydraulic fluid coupling direct drive clutch 14, a front unit gear set 16, and a gear rear unit gear set 18.

An engine driven power input shaft 20 drives an impeller 22 of torque converter unit 12 and an impeller 45 of fluid coupling unit 14 by means of a suitable drum 21. A turbine 23 of unit 12 is connected to a ring gear 25 of front unit gear set 16 for driving the ring gear. A reaction member 24 disposed between impeller 22 and turbine 23 functions to re-direct fluid discharged from turbines 23 to the entrance to impeller 22 such that the fluid entering the impeller tends to drive the impeller. Reaction member 24 is fixed to a final power delivery shaft 60 and functions as a second turbine when operating in reverse drive to impart torque directly to the power delivery shaft. A front unit planet carrier 28 supports a plurality of planet pinion gears 26 in mesh with ring gear 25 and a sun gear 27. An engageable and releasable clutch 29 is effective when engaged to lock ring gear 25 to sun gear 27.

Reactor 24 is connected to a final power delivery shaft 60 for rotation therewith as a unit. A hollow sleeve shaft 30 is splined to planet carrier 28 and to a clutch hub 41 of a forward clutch indicated generally at 40. A second hollow sleeve shaft 31 is splined to sun gear 27, clutch 29, a turbine 46, an engageable and releasable brake disc 47, an inner race 48 of a one-way brake 50, and to a sun gear 37 of a rear gear unit 18 such that all of these elements rotate with shaft 31 as a unit.

A rear gear unit 18 includes a planet carrier 36 supporting a plurality of planet pinions 38 in mesh with sun gear 37 and a ring gear 39. Ring gear 39 is fixed for rotation with final power delivery shaft 60. A one-way brake 52 prevents rotation of planet carrier 36 when the transmission is conditioned for low or first gear operation. A disc brake indicated generally at 53 is applied in second gear drive to render the one-way brake 50 effective.

Fluid coupling unit 14 is of the type adapted to be alternately filled with and emptied of working fluid and is filled to establish high or direct drive. A cone brake 55 may be engaged for overrun or downhill braking and is engaged when shifting into reverse.

In operation, first or low gear drive is establish by engaging forward drive clutch 40. Fluid coupling 14 is emptied of working fluid. Since reactor 24 is fixed for rotation with output shaft 60, the reactor will initially remain stationary due to the load of the vehicle on shaft 60. With forward drive clutch 40 engaged, the front gear unit carrier 28 likewise is locked to shaft 60 and will tend to remain stationary. Turbine 23 drives ring gear 25 and due to the vehicle load resisting rotation of carrier 28, sun gear 27 and sleeve shaft 31 are driven in reverse at reduction drive with torque multiplication determined both by the drive ratio established by the torque converter 12 and by gear unit 16. Sun gear 37 of the rear gear unit 18 is driven in reverse direction by shaft 31. Due to the vehicle load on ring gear 39, planet carrier 36 tends to spin but such action is prevented by one-way brake 52 which locks up to prevent rotation of carrier 36. With carrier 36 held against rotation by one-way brake 52, ring gear 39 is driven forwardly through the gear unit 18 adding to the torque multiplication of gear unit 18.

It will readily be understood that maximum torque multiplication will occur at standing start condition of operation when both reactor 24 and carrier 28 of the front gear unit are momentarily stationary. As the vehicle gains speed, reactor 24 and planet carrier 28, both of which are locked to output shaft 60 for rotation therewith, will rotate forwardly at the speed of rotation of shaft 60. Reactor 24 will act as a forwardly rotating reactor member and the torque multiplication of the converter 12 will decrease with increase in speed of rotation of reactor 24. This characteristic of maximum torque multiplication at standing start and reduction of torque multiplication in the converter, which results in reduced input to the front gear unit 16, has been found to be advantageous since gear unit 18 still provides adequate torque multiplication for low gear drive to bring the vehicle rapidly up to a desirable speed for shift into second gear drive. The arrangement provides large initial maximum torque for vehicle start and in addition provides good vehicle acceleration after the vehicle is in motion without overspeed of the engine when operating in low gear drive.

Shift to second gear drive is accomplished by maintaining clutch 40 engaged and applying disc brake 53. Turbine reactor 24 and planet carrier 28 remain locked to output shaft 60 and rotate forwardly at the speed of rotation of shaft 60. However, with disc brake 53 engaged, one-way brake 50 locks up to prevent reverse rotation of shaft 31 and sun gears 27 and 37. On the other hand, one-way brake 52 releases to permit planet carrier 36 of gear unit 18 to freely spin. Fluid coupling 14 remains empty of working fluid.

In second gear drive both reactor 24 and carrier 28 continue to rotate at speed of rotation of output shaft 60. With sun gear 27 held against reverse rotation by one-way brake 50, planet carrier 28 is driven forwardly at the gear reduction provided by gear unit 16. Since the forward speed of rotation of reactor 24, which rotates at output shaft speed, is increased, the torque multiplication of converter 12 decreases in second gear drive. This is desirable since gear unit 16 is given a ratio adequate to provide desirable drive ratio in second gear.

For direct drive operation, clutch 40 remains engaged and fluid coupling 14 is filled with working fluid. In direct drive operation, drive is entirely hydraulic and split torque is accomplished. With coupling 14 filled with fluid, turbine 46 drives shaft 31 and sun gears 27 and 37 forwardly at engine speed less hydraulic slip. Turbine 23 drives ring gear 25 at engine speed less hydraulic slip. With both ring gear 25 and sun gear 27 driven substantially at engine speed, gear unit 16 is locked up for direct drive and carrier 28 rotates at engine speed less hydraulic slip. Since carrier 28 is locked up to shaft 60 through clutch 40, shaft 60, ring gear 39 and reactor 24 all rotate at the speed of output shaft 60. In direct drive operation, reactor 24 rotates forwardly substantially at engine speed and functions as a second turbine rather than a reaction member. Fluid leaving impeller 22 strikes the rear or back side of the vanes of reactor 24, thus tending to drive the reactor forwardly to impart a further forward thrust component to shaft 60. Thus, in direct drive, both turbine 23 and member 24 of converter 12 act as hydraulic turbines to apply forward thrust to shaft 60. In addition, turbine 46, through locked up gear unit 18, applies a further forward thrust component to output shaft 60. The all hydraulic three turbine drive provides a very high degree of vibration dampening of engine vibrations with consequent smooth high gear drive and in addition, due to the split torque feature reduces hydraulic losses and provides an efficient high gear drive.

Reverse operation is accomplished by releasing clutch 40, releasing brake 53, emptying coupling 14 of fluid, applying reverse cone brake 55, and applying clutch 29. With clutch 29 engaged, ring gear 25 is locked to sun gear 27 and shaft 31 is rotated forwardly by turbine 23 through the torque multiplication of converter 12. Sun gear 37 rotates forwardly at speed of rotation of turbine 23 and brake 55 holds planet carrier 36 against rotation. Ring gear 39 drives shaft 60 in reverse through further gear reduction of gear unit 18. It will be noted that in reverse operation reactor 24, which is fixed to shaft 60 will also rotate reversely at the speed of rotation of shaft 60. Reactor 24, during reverse operation, functions both as a rearwardly rotating reaction member to re-direct fluid into impeller 22 tending to drive impeller 22 forwardly and as a turbine tending to drive shaft 60 rearwardly. Thus in reverse, we have torque multiplication in converter 12, gear reduction in gear unit 18 and hydraulic drive of shaft 60 by means of reactor 24.

Neutral or no drive is accomplished by releasing the various brakes and clutches. Brake 55 may be applied for overrun engine braking when operating in low gear drive. Brake 47 may be applied for overrun engine braking in second gear drive.

The various brakes and clutches may be selectively engaged by fluid pressure actuated servos of conventional design, not shown, under control of suitable valving, not shown.

The arrangement in the assembly wherein the torque converter reaction member is fixed to the output shaft for rotation therewith, the arrangement of the sun gears, one-way brake 50, one-way brake 52 and clutch 40 which clutches reactor 24, carrier 28, ring gear 39 and output shaft 60 to each other in all forward drive ratios, and the split hydraulic torque drive in high gear forward drive are believed novel features of this design. The function of reactor 24 in applying a forward thrust to the output shaft in high gear direct drive and a reverse thrust to the output shaft in reverse drive is likewise believed novel.

I claim:

1. In a transmission, a hydraulic torque converter including an impeller, a turbine and a reaction member, a fluid coupling of the type adapted to be selectively filled with and emptied of working fluid and including an impeller and a turbine, an engine driven power input shaft connected to both of said impellers for driving the same, a first gear unit, a planet carrier supporting a planet pinion gear in mesh with a ring gear and a sun gear, a final power delivery shaft, means connecting said converter reaction member to said final power delivery shaft for rotation therewith as a unit, a second gear unit including a planet carrier supporting a planet pinion in mesh with a sun gear and a ring gear, said last mentioned ring gear being connected to said final power delivery shaft for rotation therewith as a unit, an engageable and releasable clutch effective in all forward drive ratios to connect said first gear unit carrier to said final power delivery shaft for rotation therewith as a unit, means connecting said sun gears to each other and to said fluid coupling turbine for rotation as a unit, means for preventing rotation of said second gear unit planet carrier for completing the establishment of first or low gear drive when said clutch is engaged, engageable and releasable brake means for preventing rotation of both of said sun gears to establish second gear drive when said clutch is engaged, said fluid coupling being filled with fluid and said clutch being engaged to establish direct drive through said transmission.

2. In a transmission, a hydraulic torque converter including an impeller, a turbine and a reaction member, a fluid coupling of the type adapted to be selectively filled with and emptied of working fluid and including an impeller and a turbine, an engine driven power input shaft for driving both of said impellers, a final power delivery shaft, a first gear unit including a planet carrier supporting a planet pinion gear in mesh with a ring gear and a sun gear, said ring gear being driven by said converter turbine and said converter reaction member being fixed to said final power delivery shaft for rotation therewith as a unit, an engageable and releasable clutch effective when engaged to clutch said planet carrier to said output shaft, a second gear unit including a second planet carrier supporting a planet pinion gear in mesh with a second ring gear and a second sun gear, said second ring gear being connected to said final power delivery shaft for rotation therewith and said second sun gear being connected to said first-mentioned sun gear and said fluid coupling turbine for rotation therewith, means for establishing first gear reduction drive including said clutch and a one-way brake on said second gear unit planet carrier, means for establishing second gear forward drive including said clutch and a one-way brake for preventing rotation of both of said sun gears, and means for establishing direct forward drive including said clutch and said fluid coupling when said fluid coupling is filled with working fluid.

3. In a transmission, a hydraulic torque converter including an impeller, a turbine and a reaction member, a fluid coupling of the type adapted to be selectively filled with and emptied of working fluid having an impeller and a turbine, an engine driven power input shaft connected to said impellers for driving said impellers in a forward direction, a first planetary gearing unit including a ring gear driven by said converter turbine, a sun gear and a planet carrier supporting a planet pinion gear in mesh with said ring gear and said sun gear, a final power delivery shaft, a second planetary gearing unit including a ring gear fixed to said final power delivery shaft for rotation therewith, a second sun gear and a planet carrier supporting a planet pinion gear in mesh with said ring gear and second sun gear, means connecting said torque converter reaction member to said final power delivery shaft for rotation therewith, a clutch for clutching said first gear unit planet carrier to said final power delivery shaft, means connecting said sun gears to each other and to said fluid coupling turbine for rotation as a unit, means for establishing first gear forward drive including a one-way brake for preventing rotation of second gear unit planet carrier and said clutch, means for establishing second gear forward drive including a second one-way brake for preventing rotation of both of said sun gears and said clutch, and means for establishing direct forward drive including said fluid coupling and said clutch.

4. In a transmission, a hydraulic torque converter including an impeller, a turbine and a reaction member, a fluid coupling of the type adapted to be selectively filled with and emptied of working fluid having an impeller and a turbine, a power input shaft for driving both of said impellers, a first planetary gearing unit including a ring gear driven by said torque converter turbine, a sun gear, and a planet carrier supporting a planet pinion gear in mesh with said ring gear and said sun gear, a final power delivery shaft, means connecting said torque converter reaction member to said final power delivery shaft for rotation therewith as a unit, an engageable and releasable clutch effective when engaged to clutch said planet carrier to said final power delivery shaft, a second planetary gearing unit including a ring gear fixed to said final power delivery shaft, a sun gear and a planet carrier supporting a planet pinion in mesh with said ring gear and said sun gear, means connecting said sun gears to each other and to said fluid coupling turbine for rotation as a unit, means for establishing first gear forward drive including brake means for preventing rotation of said second gear unit planet carrier in at least one direction and said clutch, means for establishing second gear forward drive including brake means for preventing rotation of both of said sun gears in at least one direction and said clutch, means for establishing direct forward drive including said fluid coupling and said clutch, and means for establishing reverse drive including a two-way brake for preventing rotation of said second gear unit planet carrier and a second clutch for locking two elements of said first gear unit to each other.

5. In a transmission, a hydraulic torque converter including an impeller, a turbine and a reaction member, a fluid coupling of the type adapted to be selectively filled with and emptied of working fluid and having an impeller and a turbine, an engine driven power input shaft connected to both said impellers for driving the same, a first planetary gearing unit including a ring gear, a sun gear and a planet carrier supporting a planet pinion gear in mesh with said ring gear and sun gear, means connecting said ring gear to said torque converter turbine for rotation therewith, a final power delivery shaft, means connecting said torque converter reaction member to said final power delivery shaft for rotation therewith, an engageable and releasable clutch effective when engaged to clutch said planet carrier to said final power delivery shaft for rotation therewith, a second planetary gearing unit including a ring gear, a sun gear, and a planet carrier supporting a planet pinion gear in mesh with said ring gear and said sun gear, means connecting said second gear unit ring gear to said final power delivery shaft for rotation therewith as a unit, means connecting said sun gears to each other and to said fluid coupling turbine for rotation as a unit, means for establishing first gear drive including a one-way brake for preventing rotation of said second gear unit carrier in one direction and said clutch, means for establishing second gear drive including a one-way brake for preventing rotation of both of said sun gears in one direction and said clutch, means for establishing direct drive including said fluid coupling and said clutch, and means for establishing reverse drive including a two-way brake for preventing rotation of said second gear unit carrier in any direction and a second clutch for clutching said first gear unit ring gear to said first gear unit sun gear.

6. In a transmission, a hydraulic torque converter including an impeller, a turbine and a reaction member, a fluid coupling of the type adapted to be selectively filled with and emptied of working fluid having an impeller and a turbine, an engine driven power input shaft connected to both of said impellers for driving the same, a first planetary gearing unit having a ring gear driven by said torque converter turbine, a sun gear and a planet carrier supporting a planet pinion gear in mesh with said ring gear and sun gear, a final power delivery shaft, means connecting said torque converter reaction member to said final power delivery shaft for rotation therewith, an engageable and releasable clutch effective in all forward drive ratios to clutch said planet carrier to said final power delivery shaft for rotation therewith, a second gear unit having a ring gear fixed to said final power delivery shaft for rotation therewith and having a planet carrier supporting a planet pinion in mesh with a ring gear and a sun gear, means connecting said sun gears and said fluid coupling turbine to each other for rotation as a unit, means for establishing first gear forward drive including a one-way brake for preventing rotation of said second gear unit planet carrier in one direction and said clutch, means for providing overrun braking in first gear including a two-way brake effective when engaged to prevent rotation of said second gear unit planet carrier, means for establishing second forward drive including a one-way brake for preventing rotation of said sun gears and said clutch, means for providing overrun braking in second gear including a two-way brake for preventing rotation of said sun gears and said clutch, means for establishing direct forward drive including said fluid coupling and said clutch, and means for establishing reverse drive including said first-mentioned two-way brake and a second clutch effective when engaged to lock up said first gear unit to drive both of said sun gears at the speed of rotation of said torque converter turbine.

7. In a transmission, a hydraulic torque converter having an impeller, turbine and reaction member, a fluid coupling of the type adapted to be selectively filled with and emptied of working fluid, an engine driven power input shaft for driving both of said impellers, a first gear unit including a ring gear driven by said converter turbine, a sun gear and a planet carrier supporting a planet pinion gear in mesh with said ring gear and sun gear, a final power delivery shaft, means including a shaft for connecting said converter reaction member to said final power delivery shaft for rotation therewith, a sleeve shaft connected to said planet carrier for rotation therewith, a forward drive clutch engaged in all forward drive ratios for clutching said sleeve shaft to said final power delivery shaft, a second planetary gear unit having a ring gear fixed for rotation with said final power delivery shaft, a sun gear and a planet carrier supporting a planet pinion in mesh with said ring gear and said sun gear, a second sleeve shaft for connecting said sun gears and said fluid coupling turbine to each other for rotation as a unit, means for establishing first gear forward drive including said clutch and a brake for braking said second gear unit planet carrier against rotation, means for establishing second gear forward drive including said clutch and a brake for braking said second-mentioned sleeve shaft against rotation, means for establishing direct forward drive including said clutch and said fluid coupling, and means for establishing reverse drive including said first-mentioned brake and a second clutch, said second clutch being effective when engaged to lock up said first gear unit in direct drive.

8. The arrangement set forth in claim 7 including a one-way brake for preventing rotation of said second gear unit planet carrier in first gear forward drive and a second optionally engageable two-way brake effective when engaged in either first gear forward drive or reverse drive to prevent rotation of said second gear unit planet carrier.

9. The arrangement set forth in claim 7 including a second optionally engageable two-way brake for preventing rotation of said second sleeve shaft for overrun braking in second gear forward drive.

10. The arrangement set forth in claim 7 wherein said last-mentioned clutch clutches said first gear unit ring gear to said second-mentioned sleeve shaft to complete the establishment of reverse drive.

References Cited by the Examiner

UNITED STATES PATENTS

| | | | |
|---|---|---|---|
| 2,518,824 | 8/1950 | Simpson | 74—763 |
| 2,873,625 | 2/1959 | Simpson | 74—763 |
| 3,019,670 | 2/1962 | Kelley | 74—677 |
| 3,021,726 | 2/1962 | House | 74—677 |
| 3,024,668 | 3/1962 | Kronogard et al. | 74—677 X |
| 3,063,308 | 11/1962 | Wayman | 74—677 |
| 3,073,182 | 1/1963 | Harmon | 74—677 |
| 3,141,354 | 7/1964 | Herndon | 74—677 |
| 3,150,541 | 9/1964 | Flinn | 74—677 |

DAVID J. WILLIAMOWSKY, *Primary Examiner.*

JOHN R. BENEFIEL, *Examiner.*